United States Patent Office 3,242,118
Patented Mar. 22, 1966

3,242,118
RESORCINOL-ALDEHYDE RESIN AND TIRE
CORD ADHESIVE MADE THEREFROM
William E. St. Clair, Pittsburgh, and Roy H. Moult,
Butler, Pa., assignors to Koppers Company, Inc., a
corporation of Delaware
No Drawing. Filed Jan. 21, 1963, Ser. No. 252,559
6 Claims. (Cl. 260—29.3)

This invention relates to resorcinol-aldehyde resins useful in the preparation of adhesives. In one specific aspect it relates to the resinous condensation product of resorcinol with two different aldehydes, and to the use of this condensation product in adhesive dips for bonding rubber to textile tire cord. In a further aspect it relates to the bonding of butyl rubber to textile tire cord using a new adhesive formulation.

The bonding of rubber stock to fabric using resorcinol-aldehyde resins is well known. William Hale Charch, in U.S. Patent 2,128,635, describes the bonding of fabrics to natural or synthetic rubber stock using a heat-hardenable resorcinol-aldehyde resin, preferably a resorcinol-formaldehyde resin. Charch suggests that other aldehydes may be substituted for formaldehyde, either wholly or in part, but does not describe any specific process illustrating how this may be done. Hershberger, in U.S. 2,111,951, describes the bonding of natural or synthetic rubber to rayon tire cord. He also employs resorcinol-aldehyde condensation products in the preparation of his adhesive, noting that the use of formaldehyde is preferred, although acetaldehyde or crotonaldehyde can be substituted for the formaldehyde, either wholly or in part, in the preparation of the resin. The aldehyde is used preferably in amounts of 1–2 moles of aldehyde per mole of resorcinol.

Although the resins recommended by Charch and Hershberger for the bonding of rubber stock to textile tire cord have been used with considerable success with natural rubber or synthetic rubbers, such as isoprene; chloro-2-butadiene-1,3; and the like, the bonding of butyl rubber to rayon or nylon or other textile tire cords presents unique problems. It has been recognized in the art that the compatibility of the resin solution with the rubber latex has a measurable effect on both the static and dynamic adhesion of tire cord to rubber. The resins heretofore known, although acceptable with most rubber latices, generally have poor compatibility with butyl rubber latex. The use of such resins in a butyl rubber tire cord dip therefore results in poor dynamic adhesion of tire cord to rubber.

Butyl rubber latex is made from the solid pre-formed rubber by mechanical action and dispersion in an aqueous menstruum by the aid of chemical treatment. In contrast, most rubber latices are formed by an emulsion polymerization of monomeric materials, and the dispersed phase is therefore composed of smaller particles having many times more surface area and chemical reactivity than the corresponding dispersed phase of butyl latex. Unless the resorcinol resin particles are dissolved in or otherwise attached to the dispersed rubber particles, i.e., homogeneous therewith, the resin will cure to a brittle film containing discontinuous particles of butyl rubber. The result would be a high modulus inflexible film.

Surprisingly, we have discovered a novel resin made by the sequential condensation of resorcinol with paraldehyde and formaldehyde which, when used in a butyl latex adhesive dip, is substantially completely compatible with the butyl latex. The use of our new resin provides a homogeneous continuous film which is flexible and gives improved bonding strength and unexpectedly superior dynamic adhesion.

It is, therefore, an object of the present invention to provide a new resorcinol-aldehyde resin useful in the bonding of rubber stock to tire cord. It is a further object to provide a method of making the resin and a new tire cord adhesive dip incorporating the resin.

In accordance with the invention our novel resorcinol-aldehyde resin is made by substantially completely reacting, at a temperature between about 120° C. and the boiling point of the reaction mixture, resorcinol with approximately 0.15–0.32 mole of paraldehyde per mole of resorcinol in the presence of sufficient acid catalyst to lower the pH of the mixture to less than 1.5 and reacting the resulting resorcinol-paraldehyde condensation product with 0.35–0.48 mole of formaldehyde per mole of resorcinol optionally in the presence of sufficient water to lower the boiling point of the reaction mixture to at least 105° C. It is essential, for purposes of the necessary compatibility of the resulting resin with butyl latex, that the total amount of combined aldehyde is between 0.5 and 0.8 mole of aldehyde per mole of resorcinol, the amount of paraldehyde being not more than 40 mole percent of the total amount.

The novel adhesive dip, which, for the first time, provides substantially complete compatibility between the resin solution and the butyl rubber latex, comprises butyl rubber latex, the resin solution of the invention, sufficient formaldehyde or formaldehyde donor to raise the total aldehyde to resorcinol mole ratio to 1.2:1–3:1, sufficient alkali to adjust the pH to 7.5–13.5, and water of dilution to adjust the solids content to 18–25 percent by weight. The resulting adhesive dip, which may contain in addition conventional stabilizers and accelerators, has a latex to resin ratio ranging between 6:1 and 14:1.

In order to achieve sufficient compatibility between the resin solution and butyl rubber latex to provide the desired dynamic adhesion, the aldehydes condensed with resorcinol must be paraldehyde and formaldehyde. Many aldehydes, such as isodecaldehyde, isohexaldehyde, decaldehyde, butyraldehyde, isobutyraldehyde, crotonaldehyde, glyceraldehyde, and the like, when condensed with resorcinol in conjunction with formaldehyde give adhesives which are acceptable for the bonding of natural rubber, but provide incompatible or otherwise unsatisfactory butyl rubber adhesive dips. Certain other aldehydes, such as acetaldol and propionaldehyde, provide (with formaldehyde) a resin which has better compatibility with butyl rubber latex, but unfortunately shows only poor performance when the resulting bonded rubber product is tested for dynamic adhesion. Even acetaldehyde, which is the monomer from which the paraldehyde used in the invention is made, does not completely react with the resorcinol during the formation of the resin. We have found that only small amounts of free acetaldehyde interfere markedly with compatibility and lower both the static and dynamic adhesion to the point where the adhesive is commercially unattractive.

The order in which the paraldehyde and formaldehyde is condensed with resorcinol is absolutely critical. The comparative examples that follow show that if the resorcinol is first condensed with formaldehyde, it is impossible to completely react the paraldehyde with the resorcinol. The unreacted paraldehyde depolymerizes to acetaldehyde and causes phase separation in the butyl rubber adhesive dip. The addition of the two aldehydes concurrently also results in insufficient reaction and a resin solution of poor compatibility with butyl latex.

In order to obtain substantially complete reaction between the paraldehyde and resorcinol, the initial condensation must be carried out at a temperature between about 120° C. and the boiling point of the reaction mixture. If lower temperatures are used, complete reaction is not obtained and the resulting resin has diminished compatibility with butyl rubber latex.

The initial condensation should be carried out in the substantial absence of water, other than that formed during the condensation and that required to dissolve the catalyst, in order to insure complete reaction. The condensation between the resorcinol and paraldehyde must be conducted in the presence of an acid catalyst strong enough to lower the pH of the reaction mixture to below 1.5. Oxalic acid is the preferred catalyst for the reaction, although other mineral acid catalysts, such as sulfuric acid, benzenesulfonic acid, benzenedisulfonic acid, and phosphoric acid perform satisfactorily. As is shown in the comparative examples that follow, in order to obtain complete condensation of both aldehydes, the catalyst must be added during or before the initial condensation of resorcinol with paraldehyde.

After the resorcinol-paraldehyde condensation is substantially complete, the reaction mixture is preferably diluted with sufficient water to lower the boiling point of the mixture to at least 105° C. Formaldehyde is then added in any of its various forms, e.g., Formalin (37% aqueous solution), paraformaldehyde, and the like. The water contained in the aqueous formaldehyde solution may serve either in whole or in part as that used to lower the boiling point of the reaction mixture. If paraformaldehyde is used, it is not necessary to lower the boiling point of the reaction mixture and reaction temperatures ranging from about 80° C. to the boiling point of the mixture can be used.

The number of moles of combined aldehyde in the novel resin ranges between 0.5 and 0.8 mole of aldehyde per mole of resorcinol. It is critical that the amount of paraldehyde is not less than 30 mole percent or more than 40 mole percent of the total amount of aldehyde. Thus, the resins of the invention are made by condensing with resorcinol 0.15–0.32 mole of paraldehyde per mole of resorcinol and 0.35–0.48 mole of formaldehyde. If less than 30 mole percent of paraldehyde is present, the improved bonding strength and flexibility is not obtained. If greater than 40 mole percent of paraldehyde is present, the compatibility of the dip decreases markedly and there is a sharp drop in both the static and dynamic adhesion.

After the formation of the resin is complete, the resin solution is made alkaline for use in an adhesive dip. Conveniently, sufficient caustic is added to adjust the pH to 8.0–8.1, although this pH is not critical, since a pH of 7.5–13.5 can be tolerated in the adhesive dip.

If the resin solution is to be shipped elsewhere for ultimate use, it is convenient to adjust the solids concentration to a point where the viscosity permits the solution to be poured or pumped conveniently. The solution is pourable at a viscosity below about 200 poises, and this viscosity can generally be achieved by adjusting the solids content to about 75 percent solids. A solid resin can be dissolved in water and used by the consumer, but because of the time required, it is more convenient to obtain solutions for the preparation of the tire cord dips.

The tire cord dip is made by forming an aqueous alkaline solution of rubber latex, resin, additional methylene donor, preferably formaldehyde, to convert the resin ultimately to an insoluble and infusible state, and stabilizers or accelerators if desired.

The novel resins of the invention can be used in an adhesive dip containing a rubber latex of any type, such as natural rubber, GR-S, halogenated dienes, and the like. The most striking and unexpected results, however, are obtained when the resin is used in a dip containing a butyl rubber latex. The term "butyl rubber" as used herein encompasses the recently developed halogenated butyl rubbers, such as chlorobutyl rubber and bromobutyl rubber.

The adhesive made from the novel resin can be used to bond rubber stock to any textile tire cord, rayon tire cord and nylon tire cord being most significant from the commercial point of view. The resin adhesive dip is an aqueous solution containing 18–25 percent solids, preferably 20–22 percent solids. On a dry basis the latex to resin ratio ranges between 6:1 and 14:1, preferably between 10:1 and 12:1. In addition to the rubber latex and the resin, additional methylene donor, preferably formaldehyde, is added in such an amount that the total aldehyde to resorcinol mole ratio ranges between 1.2–3.0 moles of aldehyde per mole of resorcinol, preferably 1.5–2.1 moles of aldehyde per mole of resorcinol. The aldehyde serves to convert the resin to an insoluble, infusible state during the curing of the rubber-coated tire cord. An alkaline substance, such as sodium hydroxide or ammonium hydroxide, is added to the dip to adjust the pH to 7.5–13.5, preferably in the range of 8.1–8.4. Conventional stabilizers, such as zinc oxide, may be added to the dip as desired.

The astonishing feature of the use of the novel resin solutions prepared according to the method of the invention is the substantially complete compatibilty of these resin solutions with butyl rubber latex. The necessity for such compatibility will become apparent from the discussion and the examples that follow.

The tire cord is treated under tension with the adhesive dip in a latex dipping machine. The treated cord is then dried and cured in the conventional manner.

The successful bonding of rubber to tire cord is measured by both static and dynamic adhesion tests. For many years the tire and rubber industry has relied on the H-test as a method for the determination of static adhesion of textile cords to rubber. The main variables in this test are discussed by Moult and Martin, Material and Research Standards, vol. II, No. 10, October 1962, page 813. The H-test is the mehod for the measurement of the force necessary to pull a single cord axially from a small block of rubber in which it is embedded. Ideally, the shear strength at the adhesive film-rubber or adhesive film-cord interface would be measured. In performing the test, two small blocks of rubber are bonded by an interconnecting cord to form a specimen which resembles the letter "H," thus characterizing the test. The rupture is effected by pulling the specimens apart by means of two hook-type clamps; failure occurs when the bond in either one of the blocks is ruptured. Committee D-11 of ASTM has recommended the use of a standard one-fourth inch H-test specimen tested at 212° F. at a clamp speed of six inches per minute.

A bond is considered acceptable to industry from the standpoint of static adhesion if it has an H-test value of 15–17 pounds at room temperature using one-fourth inch width test specimens, with the corresponding failure of the rubber substrate. Surprisingly, the adhesive of the invention gives a bond between butyl rubber and rayon tire cord having an H-test value of 18.7 pounds under these conditions.

Dynamic adhesion is conventionally evaluated by several methods, one known method being the Albertoni test, which measures minutes to failure at 250° F. for a series of specimens under dynamic conditions. A more direct method of evaluating dynamic performance involves the construction of tires for accelerated wearing tests on cleated wheels. As shown in the examples that follow, the resin adhesive dip of the invention provides a bonding between butyl rubber and textile tire cord which gave remarkable performance in both types of tests.

Our invention is further illustrated by the following examples:

Example I

A suitable reaction flask, fitted with stirrer and condenser, was charged with 0.577 mole of resorcinol (63.6 lbs.) and 0.139 mole of paraldehyde (6.1 lbs.). The reaction mixture was heated to 80° C., whereupon the charge changed to a liquid. Agitation was begun and the temperature was raised to reflux (125–135° C.). After maintaining this temperature one and one-half hours, there was added 0.4 lbs. oxalic acid dihydrate dissolved in 3.4 lbs. water. The temperature of 125–135° C. was maintained an additional hour to produce a resin containing 0.25 mole of paraldehyde per mole of resorcinol. There was then added 0.22 mole (18 lbs.) of formaldehyde (as a 37% aqueous solution) slowly over a period of about one-half hour. At the end of the addition period, the temperature dropped to 100–105° C. and the resulting resin contained 0.65 mole of combined aldehyde per mole of resorcinol.

The resin solution was prepared for use in a tire cord dip by adding sufficient sodium hydroxide (8.5 lbs. of 50% aqueous caustic soda) to bring the pH of the solution to 8.0. Water of dilution was added to provide a final solids concentration of 75.81 percent by weight.

The resulting resin solution had a viscosity of 80 poises at 23° C. and was stable over 24 months at room temperature.

*Example II*

An adhesive dip for rayon tire cord was made by forming a solution containing 220 pounds of the resin solution of Example I (adjusted to 75% solids), 256 parts of butyl rubber latex (55% solids), 25.6 pounds of formaldehyde, 518 pounds of water, 2.8 pounds of zinc oxide and 5.5 pounds of sodium hydroxide. The resin, water, formaldehyde and caustic soda were mixed and aged at 23° C. for four hours. The resin solution was mixed with the latex, adjusted to a pH of 8.5 with sodium hydroxide and aged for 24 hours at room temperature. The resulting resin adhesive dip showed a dip separation, determined by measuring the pre-formed lower layer, of less than one percent.

Twelve hundred feet of rayon cord was treated in a standard dipping machine at 40–80 g. tension, dried with about 0.5 pound tension at 300° F. Bonded stock thus prepared was evaluated for H-test adhesion and gave a static H-test value of 18.7 pounds using one-quarter inch specimens at room temperature.

*Example III*

The procedure of Example I was repeated with the substitution of aldehydes, other than paraldehyde, as the aldehyde to be reacted with resoricinol in conjunction with formaldehyde. The resulting resins were used in dips for bonding natural and butyl rubber prepared generally according to the procedure of Example II. The performance of the resin solution of Example I in the dip of Example II is given for purposes of comparison, and a conventional resorcinol-formaldehyde resin prepared generally according to the procedure described by P. H. Rhodes in U.S. 2,385,372 was used as a control.

The results of the static H-test adhesion on one-quarter inch specimens is shown in Table I.

TABLE I

| Aldehyde Used in Prep. of Resin | Rubber | |
|---|---|---|
| | Natural (100° C.) | Butyl (23° C.) |
| Paraldehyde | 21.0 | 18.7 |
| Control | 17.2 | 12.6 |
| Isodecaldehyde | 15.9 | 10.3 |
| Propionaldehyde | 17.6 | 12.8 |
| Isohexaldehyde | 18.3 | 11.0 |
| Decaldehyde | 16.1 | 10.2 |
| n-Butyraldehyde | 17.9 | 15.3 |
| Isobutyraldehyde | 17.8 | 16.0 |
| Crotonaldehyde | 21.7 | 15.1 |
| Acetaldol (1:1 Acetaldol:Formaldehyde) | 11.6 | 7.1 |
| Acetaldol | 17.8 | 16.0 |

It is thus seen that the resin solution of the invention gave the best results in the bonding of butyl rubber from the standpoint of static adhesion. Marginal results were obtained using certain of the other aldehydes, although substitution of an aldehyde other than paraldehyde in most cases resulted in complete unacceptability. The conventional resorcinol-formaldehyde resin use as a control failed to meet the required H-test standard of at least 15 pounds when used in a butyl rubber adhesive dip.

*Example IV*

Three resins made following the procedure of Example III were examined for dynamic adhesion by the Albertoni test. The results, with tests on butyl rubber stock, are shown in Table II.

TABLE II

| Aldehyde Used In Resin | Dynamic Adhesion, Albertoni—250° F.—Minutes to Failure (Average of 8 Specimens) |
|---|---|
| Formaldehyde (only) | 0 |
| Paraldehyde | 24 |
| Acetaldol | 10 |
| Propionaldehyde | 2 |

It is seen from the above table that acetaldol, although it gave successful results with the static adhesion test, was dramatically inferior to the paraldehyde from the standpoint of dynamic adhesion. Similar difficulties in dynamic adhesion are obtained if acetaldehyde rather than acetaldol is substituted for the paraldehyde.

*Example V*

Tire cord made according to Example II using the novel resin of the invention was made into three tires and evaluated by actual road tests. As a control three tires were made using a dip containing butyl latex and a resorcinol-formaldehyde resin formed in situ. The results are shown in Table III.

TABLE III.—TIRE PERFORMANCE TESTS ON RAYON CORD ADHESIVE FORMULATIONS

A. Adhesive dip made with butyl latex and resin of Example I

| Tire Designation | Mileage | Mode of Failure |
|---|---|---|
| 1 | 5,940 | None—Tire Okay. |
| 2 | 8,640 | Do. |
| 3 | 12,960 | Do. |

B. Adhesive dip made with standard resorcinol-formaldehyde resin formed in situ

| | | |
|---|---|---|
| 4 | 3,816 | Shoulder Chunkout. |
| 5 | 4,824 | Two Shoulder Chunkouts. |
| 6 | 8,640 | Blister in Shoulder. |

In the following three examples the general procedure of Example I was followed with the exception that some of the steps were altered in order to show their critical nature.

*Example VI*

1.9 moles of 37 percent formaldehyde, 5 moles of resorcinol, and 0.5 percent by weight of oxalic acid were charged to a reaction flask fitted with a stirrer and condenser, heated to reflux and boiled for 30 minutes. The distillate was then removed until the temperature of the reaction mixture rose to 125° C. 1.2 moles of paraldehyde was added and the reaction mixture was refluxed for one hour, during which time the temperature dropped to 120° C. The pH of the final product was adjusted to pH 8.1 with an aqueous solution of sodium hydroxide. The physical properties of the product were as follows:

Solids—74.26%

Viscosity—101 poises at 23° C.

Stability—Resin separated into 2 layers after 10 days' storage at room temperature The product was formulated into a butyl rubber adhesive dip according to the procedure of Example II. The dip separation and H-test adhesion were as follows:

H-test adhesion—¼″ specimens tested at room temperature—14.2 lbs. (on butyl adhesion stock)

Dip separation—percent lower layer=60.1%

It is thus seen that the procedure of this example provides an untable resin with low static adhesion. The resin makes an incompatible adhesive dip.

*Example VII*

A mixture of 1.2 moles of paraldehyde and 5 moles of resorcinol was charged and heated with agitation to 115° C. for one hour. 1.9 moles of formaldehyde was added, followed by the addition of 0.5% by weight of oxalic acid. The reaction mixture was refluxed for one hour, the temperature dropping to 103° C. The pH was adjusted to 8.1 and the mixture was diluted with water to 75±1% solids. The physical properties of the product were as follows:

Solids—74.29%
Viscosity—92 poises at 23° C.
Stability—Resin separated into 2 layers after 8 days at room temperature.

The product was formulated into a butyl rubber adhesive dip according to the procedure of Example II. The dip separation and H-test adhesion were as follows:

H-test adhesion—¼″ specimens at room temperature—14.1 lbs. (on butyl adhesion stock)
Dip separation—percent lower layer=62.5%

It is thus seen that the procedure of this example provides an unstable resin with low static adhesion. The resin makes an incompatible adhesive dip.

*Example VIII*

A mixture containing 1.9 moles of 37 percent formaldehyde and 1.2 moles of paraldehyde was weighed out, and 40% of this mixture added to the reaction flask. The mixture was not compatible, but by rapid shaking an approximate homogeneous charge was obtained. Five moles of resorcinol were charged and the mixture was heated to reflux and boiled for 15 minutes. The remainder of the aldehyde mixture was charged, followed by 0.5% by weight oxalic acid. The mixture was then refluxed for one hour at 107° C. After dilution to 75 percent solids and adjustment to pH 8.1, the product had the following properties:

Solids—75.3%
Viscosity—118 poises at 23° C.
Stability—Resin separated after 10 days at room temperature The product was formulated into a butyl rubber adhesive dip according to the procedure of Example II. The dip separation and H-test adhesion were as follows:

H-test adhesion—¼″ at room temperature—14.0 lbs. (on butyl adhesion stock)
Dip separation—percent lower layer=56.6%

It is thus seen that the procedure of this example provides an unstable resin with low static adhesion. The resin makes an incompatible adhesive dip.

We claim:

1. Method of making a resorcinol-aldehyde resin solution, characterized by compatibility with butyl rubber latex, comprising
   (a) substantially completely reacting, at a temperature between about 120° C. and the boiling point of the reaction mixture, resorcinol with approximately 0.15–0.32 mole of paraldehyde per mole of resorcinol in the presence of sufficient acid catalyst to lower the pH of the mixture to less than 1.5, and
   (b) reacting the resulting resorcinol-paraldehyde condensation product with 0.35–0.48 mole of formaldehyde per mole of resorcinol at a temperature up to the boiling point of the reaction mixture in the presence of sufficient water to lower the boiling point of the reactoin mixture to at least 105° C.
the total amount of combined aldehyde being 0.5–0.8 mole of aldehyde per mole of resorcinol and the amount of paraldehyde being not more than 40% of said total amount.

2. Method of making a resorcinol-aldehylde resin solution, characterized by compatibility with butyl rubber latex, comprising
   (a) substantially completely reacting, at a temperature between about 120° C. and the boiling point of the reaction mixture, resorcinol with approximately 0.15–0.32 mole of paraldehyde per mole of resorcinol in the presence of sufficient acid catalyst to lower the pH of the mixture to less than 1.5, and
   (b) reacting the resulting resorcinol-paraldehyde condensation product with 0.35–0.48 mole of formaldehyde per mole of resorcinol in the presence of sufficient water to lower the boiling point of the reaction mixture to at least 105° C.
the total amount of combined aldehyde being 0.5–0.8 mole of aldehyde per mole of resorcinol and the amount of paraldehyde being not more than 40% of said total amount.

3. Method of making a resorcinol-aldehyde resin solution, characterized by compatibility with butyl rubber latex, comprising
   (a) substantially completely reacting, at a temperature between about 120° C. and the boiling point of the reaction mixture, resorcinol with approximately 0.25 mole of paraldehyde per mole or resorcinol in the presence of sufficient oxalic acid catalyst to lower the pH of the mixture to less than 1.5, and
   (b) reacting the resulting resorcinol-paraldehyde condensation product with 0.40 mole of formaldehyde per mole of resorcinol in the presence of sufficient water to lower the boiling point of the reaction mixture to at least 100° C.
the total amount of combined aldehyde being 0.65 mole of aldehyde per mole of resorcinol.

4. A resorcinol-aldehyde resin solution, characterized by compatibility with butyl rubber latex, prepared by the process comprising
   (a) substantially completely reacting, at a temperature between about 120° C. and the boiling point of the reaction mixture, resorcinol with approximately 0.15–0.32 mole of paraldehyde per mole of resorcinol in the presence of sufficient acid catalyst to lower the pH of the mixture to less than 1.5, and
   (b) reacting the resulting resorcinol-paraldehyde condensation product with 0.35–0.48 mole of formaldehyde per mole of resorcinol at a temperature up to the boiling point of the reaction mixture in the presence of sufficient water to lower the boiling point of the reaction mixture to at least 105° C.
the total amount of combined aldehyde being 0.5–0.8 mole of aldehyde per mole of resorcinol and the amount of paraldehyde being not more than 40% of said total amount.

5. A tire cord adhesive dip comprising butyl latex, the resorcinol-aldehyde resin solution of claim 4, formaldehyde in an amount sufficient to raise the total aldehyde to resorcinol mole ratio to 1.2–3 moles of aldehyde per mole of resorcinol, sufficient alkali to adjust the pH of the dip to 7.5–13.5 and sufficient water of dilution to adjust the solids content of the dip to 18–25 percent by weight, the dry basis ratio of butyl latex to resin solids being 6:1–14:1.

6. Butyl rubber-coated textile tire cord prepared by dipping textile tire cord in the dip of claim 5.

References Cited by the Examiner

UNITED STATES PATENTS

| | | | |
|---|---|---|---|
| 1,598,546 | 8/1926 | Baekeland et al. | 260—51 |
| 3,116,164 | 12/1963 | Miller et al. | 260—29.3 |

MURRAY TILLMAN, *Primary Examiner.*